3,109,849
PROCESS FOR PREPARING GRISEOFULVIN
ANALOGUES
Thomas Walker, Wembley, and Godfrey Basil Webb,
Greenford, England, assignors to Glaxo Group Limited,
Greenford, England, a British company
No Drawing. Filed Oct. 12, 1961, Ser. No. 144,546
Claims priority, application Great Britain Oct. 21, 1960
5 Claims. (Cl. 260—346.2)

This invention relates to a novel process for the preparation of halogen derivatives of the grisan series.

Our copending application No. 144,547, filed October 12, 1961, describes a process for the preparation of compounds (which can be described as enol halides) corresponding to the skeletal structure

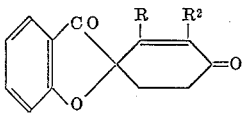

and

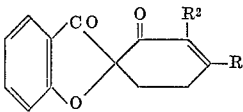

where R represents a halogen atom and $R^2$ represents a substituent as hereinafter mentioned, in which compounds corresponding to the skeletal structure

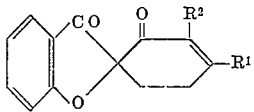

or

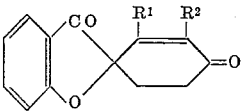

respectively are reacted with a halogenating agent serving to convert a carboxyl group (—COOH) to an acid halide group (—CO Halogen), in the presence of an alkali metal or alkaline earth metal halide, thus replacing the group $R^1$ by an oxo group and the oxo group originally present by the group R (where $R^1$ represents an ether or thioether group or an amino group and R and $R^2$ have the above meanings). It will be seen that in this process, compounds corresponding to structure III of the isogriseofulvin series are converted to enol halides corresponding to structure I of the griseofulvin series and compounds corresponding to IV of the griseofulvin series are converted to enol halides corresponding to structure II of the isogriseofulvin series.

We have found, however, that while this type of replacement takes place when the group $R^2$ in compounds III and IV is hydrogen or an alkyl or aralkyl group and also when $R^2$ is a halogen atom in compounds of structure IV, compounds of structure III in which $R^2$ is a halogen atom and $R_1$ is an ether or thioether group do not change from the isogriseofulvin series to the griseofulvin series but are converted to enol halides of structure II.

According to the present invention therefore we provide a process for the preparation of enol halides to grisan acids corresponding to the skeletal structure II (in which R and $R^2$, which may be the same or different represent halogen atoms) in which a compound corresponding to skeletal structure III in which $R^1$ represents an ether or thioether group and $R^2$ represents a halogen atom, is reacted, in the presence of an alkali metal or alkaline earth metal halide, with a compound serving to convert a carboxyl group (—COOH) to an acid halide group (—CO Halogen). The alkali metal or alkaline earth metal halide is conveniently a magnesium or, preferably, lithium halide, the chloride being preferred where chlorination is to be achieved. Phosphorus oxychloride is the preferred halogenating agent where chloride-formation is required, and has been found to give especially good results if redistilled shortly before use and mixed with a small quantity of water, preferably between 1 and 4%. The substituent $R^2$ is preferably a chlorine or bromine atom and $R^1$ is preferably an alkoxy group having 1–5 carbon atoms, e.g. a methyl, ethyl, propyl, group, etc.

The reaction may take place in the presence of a solvent such as an aromatic hydrocarbon, e.g. benzene or toluene, a ketone, e.g. acetone or an ester e.g. ethyl acetate or the halogenating agent, where liquid at the reaction temperature, may serve as reaction medium although dilution of the reactants may reduce the rate of the reaction.

The starting compounds may carry substituents in the rings, for example in the 4, 6, 7, 6' positions etc., e.g. acyloxy, alkoxy, aryloxy, aralkoxy, alkylthio, arylthio, aralkylthio, alkyl, aralkyl or aryl groups or halogen atoms.

Thus, for example 3'-chloroisogriseofulvin, the use of which is exemplified below, possesses methoxy groups in the 4- and 6-positions, a chlorine atom in the 7-position and a methyl group in the 6'-position. Methods of introducing groupings such as those listed above are disclosed in copending applications Nos. 88,647, filed February 13, 1961, now abandoned, and 79,553, filed December 30, 1960.

In order that the present invention may be well understood we give the following examples, in which all temperatures are in degrees centigrade, by way of illustration only:

EXAMPLE 1

*Preparation of 7,3',4'-Trichloro-4,6-Dimethoxy-6'-Methylgris-3'-En-3,2'-Dione*

Water (0.4 ml.) was added to freshly distilled phosphorus oxychloride (10 ml.) followed by anhydrous lithium chloride (0.97 g.) and 3'-chloroisogriseofulvin (0.97 g.), and the mixture heated on the steam bath for 5 hours. Excess solvent was then removed in vacuo and water and ethyl acetate added to the residue. The organic layer was washed with dilute hydrochloric acid, sodium carbonate solution and water, dried over magnesium sulphate and evaporated to give a solid (0.84 g.) shown by infra-red spectrum to contain 70% of the desired product and 30% starting material. This crude mixture (1.0 g.) in acetic acid (5.0 ml.) containing 2N sulphuric acid (1.0 ml.) was heated on the steam bath for 30 min. Most of the solvent was removed in vacuo, ethyl acetate and water added to the residue, and the ethyl acetate layer washed with sodium carbonate solution and water. Evaporation of the solvent followed by crystallization of the residue from ethanol/ethyl acetate gave the desired enol chloride in pure form, M.P. 229–31° identical with the sample described in copending application No 106,544, filed May 1, 1961.

EXAMPLE 2

*Preparation of 3'-Bromo-7,4'-Dichloro-4,6-Dimethoxy-6'-Methylgris-3'-En-3,2'-Dione*

Water (0.2 ml.) was added to phosphorus oxychloride (5.0 ml.) followed by lithium chloride (0.56 g.) and 3'-bromo-7-chloro-4'-ethoxy-4,6-dimethoxy-6'- methyl - gris-3'-en-3,2'-dione (0.56 g.) and the mixture heated on the steam bath for 5 hours. Working up as in the previous example gave a froth which crystallized on trituration with methanol. Further crystallization gave the desired enol chloride whose identity was confirmed by comparison of the infra-red spectrum with that of an authentic sample prepared by the process described in copending application No. 106,544.

The enol halides of the present invention may be converted into analogues of isogriseofulvin by reaction with alcohols, thiols and amines in the manner disclosed in copending application No. 106,544.

We claim:
1. A process for the preparation of enol halides of the formula

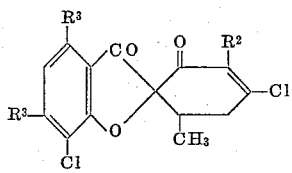

wherein $R^2$ is selected from the group consisting of chloro and bromo and $R^3$ is lower alkoxy, said process comprising reacting a compound of the formula

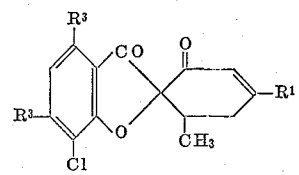

wherein $R^1$ is selected from the group consisting of lower alkoxy and lower alkylthio and $R^2$ and $R^3$ have the meanings given above with phosphorous oxychloride in the presence of a metal chloride selected from the group consisting of lithium chloride and magnesium chloride.

2. A process as claimed in claim 1 wherein 7,3',4'-trichloro-4,6-dimethoxy-6'-methylgris-3'-en-3,2'-dione is prepared by reacting 3'-chloroisogriseofulvin with phosphorous oxychloride in the presence of lithium chloride.

3. A process as claimed in claim 1 wherein 3'-bromo-7,4'-dichloro-4,6-dimethoxy-6'-methylgris-3'-en-3,2'-dione is prepared by reacting 3'-bromo-7-chloro-4'-ethoxy-4,6-dimethoxy-6'-methylgris-3-en-3,2'-dione with phosphorous oxychloride in the presence of lithium chloride.

4. A process as claimed in claim 1 in which excess phosphorous oxychloride is used as solvent medium.

5. A process as claimed in claim 1 in which said phosphorous oxychloride is distilled shortly before use and mixed with 1 to 4% by volume of water.

No references cited.